United States Patent
Matsushita

(10) Patent No.: US 12,436,026 B2
(45) Date of Patent: Oct. 7, 2025

(54) ULTRASONIC SENSOR

(71) Applicant: Murata Manufacturing Co., Ltd., Nagaokakyo (JP)

(72) Inventor: Tomoaki Matsushita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 294 days.

(21) Appl. No.: 18/243,709

(22) Filed: Sep. 8, 2023

(65) Prior Publication Data
US 2023/0417594 A1    Dec. 28, 2023

Related U.S. Application Data

(63) Continuation of application No. PCT/JP2022/001606, filed on Jan. 18, 2022.

(30) Foreign Application Priority Data

Mar. 18, 2021    (JP) .................................. 2021-045099

(51) Int. Cl.
  *G01H 11/08*    (2006.01)
  *G01S 7/521*    (2006.01)
  *H04R 17/00*    (2006.01)

(52) U.S. Cl.
  CPC .............. *G01H 11/08* (2013.01); *G01S 7/521* (2013.01); *H04R 17/00* (2013.01)

(58) Field of Classification Search
  CPC .......... G01H 11/08; G01S 7/521; H04R 17/00

USPC ........................................................... 73/658
See application file for complete search history.

(56) References Cited

U.S. PATENT DOCUMENTS

2016/0103005 A1*    4/2016    Wiest ..................... G01F 1/662
                                                          73/861.27

FOREIGN PATENT DOCUMENTS

| JP | 2004040614 A | 2/2004 |
| JP | 2011135466 A | 7/2011 |
| WO | 2014132492 A1 | 9/2014 |
| WO | 2016189812 A1 | 12/2016 |

OTHER PUBLICATIONS

International Search Report in PCT/JP2022/001606, mailed Mar. 8, 2022, 3 pages.
Written Opinion in PCT/JP2022/001606, mailed Mar. 8, 2022, 3 pages.

\* cited by examiner

*Primary Examiner* — Peter J Macchiarolo
*Assistant Examiner* — John M Royston
(74) *Attorney, Agent, or Firm* — Keating & Bennett, LLP

(57) ABSTRACT

An ultrasonic sensor includes a case including a cylindrical side wall and a bottom plate in one end portion of the side wall, and a piezoelectric element on the bottom plate inside the case. The side wall includes a pair of thick wall portions facing each other and a pair of thin wall portions thinner than the thick wall portions facing each other. An inner peripheral edge of another end portion of the side wall includes a chamfered portion. The chamfered portion of one of the pair of thin wall portions includes a recessed portion.

13 Claims, 7 Drawing Sheets

MAXIMUM VALUE: 12.982
MINIMUM VALUE: 0.055

ULTRASONIC SENSOR

CROSS REFERENCE TO RELATED APPLICATIONS

This application claims the benefit of priority to Japanese Patent Application No. 2021-045099 filed on Mar. 18, 2021 and is a Continuation Application of PCT Application No. PCT/JP2022/001606 filed on Jan. 18, 2022. The entire contents of each application are hereby incorporated herein by reference.

BACKGROUND OF THE INVENTION

1. Field of the Invention

The present invention relates to an ultrasonic sensor.

2. Description of the Related Art

An ultrasonic sensor including a cylindrical case with a bottom including a bottom plate and a side wall, and a piezoelectric element disposed on an inner bottom surface of the case has been known. An example of such an ultrasonic sensor is disclosed in Japanese Unexamined Patent Application Publication No. 2004-40614.

When manufacturing an ultrasonic sensor, a piezoelectric element is attached to an inner bottom surface of a case. At this time, if it is possible, the direction of the case is preferably identified so that the piezoelectric element can be attached in a preferable direction after knowing, for example, the inclination of a vibration surface of the case. However, when the shape of the case is symmetrical, it is difficult to identify the direction of the case.

In addition, a case of an ultrasonic sensor is manufactured by forging or the like. If changes in forming precision of the case that have been actually obtained by processing are known and can be reflected in the processing conditions, the forming precision of the case can be improved. Accordingly, a variation in shape of the case can be made small. As a result, variations among products as an ultrasonic sensor can be reduced. When variations among products is reduced, the frequency precision can be improved. However, when the shape of the case is symmetrical, it is difficult to identify the direction of the case, and it is also difficult to know changes in forming precision of the case.

As in the case of the ultrasonic sensor described in Japanese Unexamined Patent Application Publication No. 2004-40614, when a recessed portion is provided on an opening portion side of the case, the shape of the case becomes asymmetrical, and the intensity of vibration at a spurious frequency increases. The vibration at a spurious frequency is excess vibration. When the intensity of vibration at a spurious frequency increases, reverberation time increases. As a result, detection performance in a short distance in the ultrasonic sensor decreases.

SUMMARY OF THE INVENTION

Preferred embodiments of the present invention provide ultrasonic sensors in each of which a direction of a case is able to be identified without increasing the intensity of vibration at a spurious frequency.

A preferred embodiment of the present invention provides an ultrasonic sensor including a case including a cylindrical or substantially cylindrical side wall and a bottom plate in one end portion of the side wall, and a piezoelectric element on the bottom plate inside the case. The side wall includes a pair of thick wall portions facing each other and a pair of thin wall portions thinner than the thick wall portions facing each other. An inner peripheral edge of another end portion of the side wall includes a chamfered portion. The chamfered portion of one of the pair of thin wall portions includes a recessed portion.

According to preferred embodiments of the present invention, a direction of a case is able to be identified without increasing the intensity of vibration at a spurious frequency.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
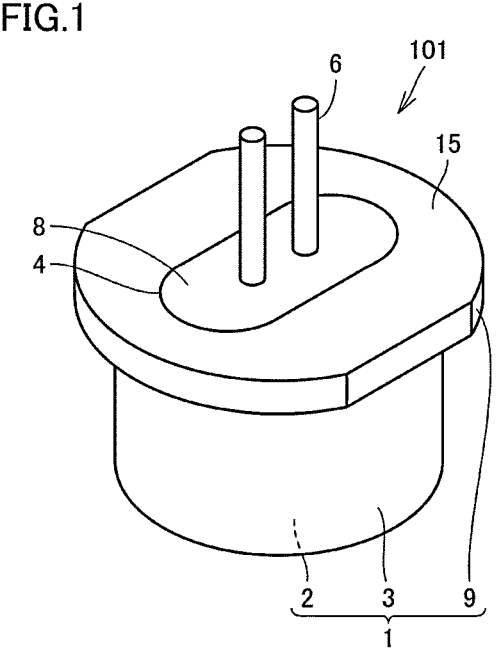
FIG. 1 is a perspective view of an ultrasonic sensor according to a first preferred embodiment of the present invention.

Dimensional ratios in the drawings do not always accurately represent the actual dimensional ratios, and the dimensional ratios may be exaggerated for convenience of description. In the following description, when referring to the concept of above or below, it does not necessarily mean absolute above or below, and may mean relatively above or relatively below in the illustrated positions.

First Preferred Embodiment

Figure 2:
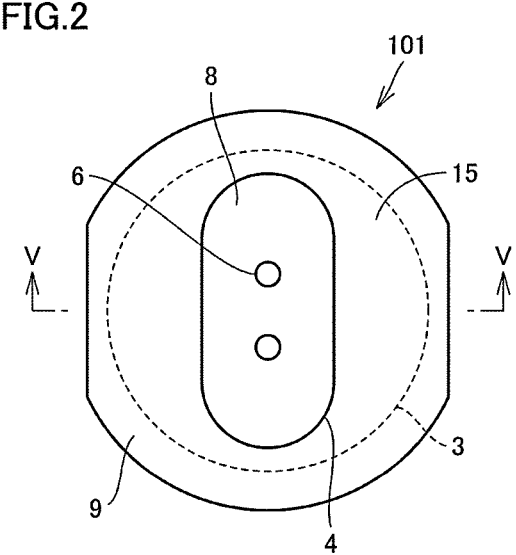
FIG. 2 is a plan view of the ultrasonic sensor according to the first preferred embodiment of the present invention.
Figure 3:
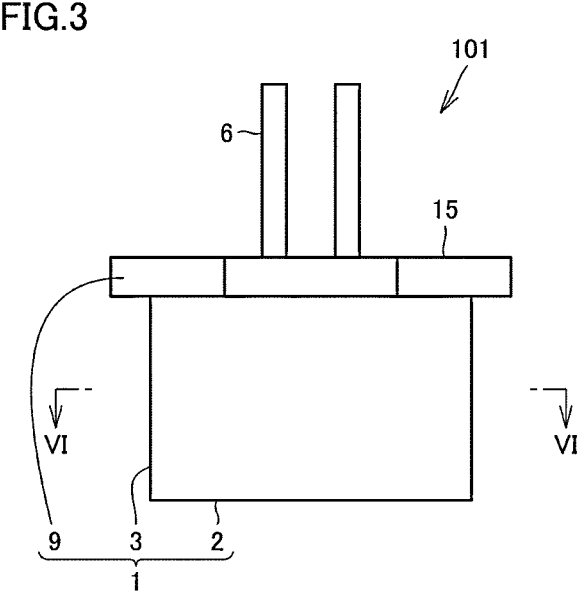
FIG. 3 is a side view of the ultrasonic sensor according to the first preferred embodiment of the present invention.
Figure 4:
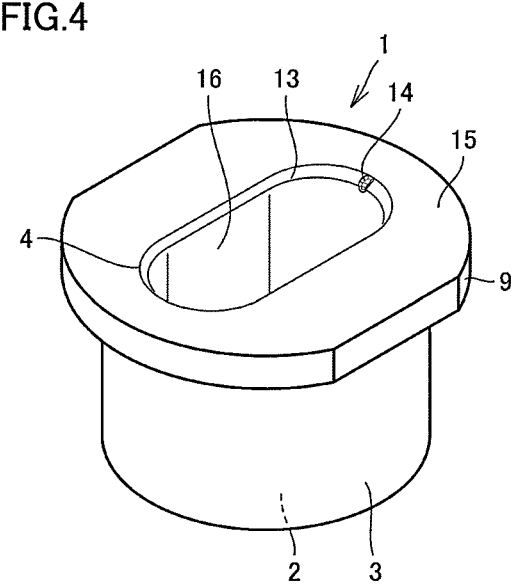
FIG. 4 is a perspective view of a case of the ultrasonic sensor according to the first preferred embodiment of the present invention.
Figure 5:
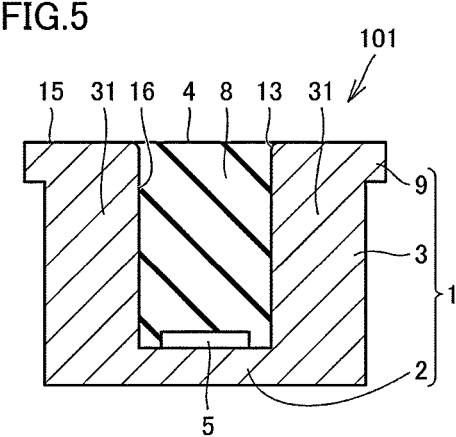
FIG. 5 is a first sectional view of the ultrasonic sensor according to the first preferred embodiment of the present invention.
Figure 6:
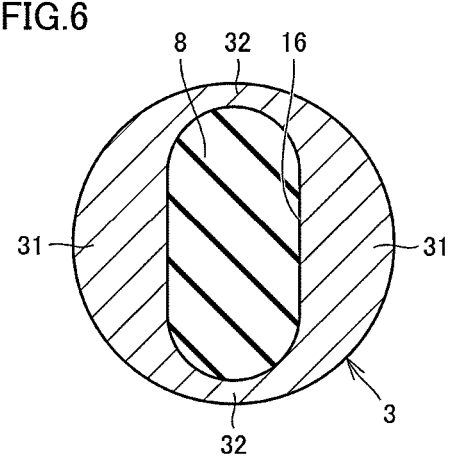
FIG. 6 is a second sectional view of the ultrasonic sensor according to the first preferred embodiment of the present invention.
Figure 7:
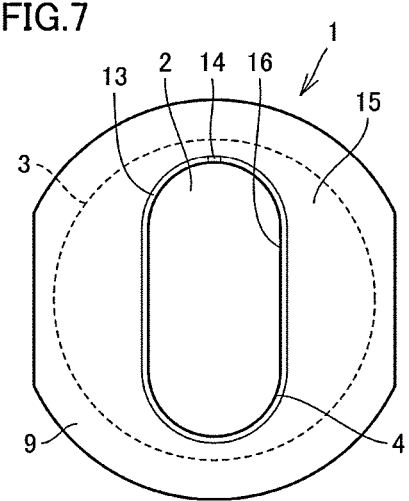
FIG. 7 is a plan view of the case of the ultrasonic sensor according to the first preferred embodiment of the present invention.

With reference to FIGS. 1 to 8, an ultrasonic sensor according to a first preferred embodiment of the present invention will be described. FIG. 1 is a perspective view of an ultrasonic sensor 101 according to the present preferred embodiment. FIG. 2 is a plan view of the ultrasonic sensor 101. FIG. 3 is a side view of the ultrasonic sensor 101. FIG. 4 is a perspective view of a case 1 included in the ultrasonic sensor 101. FIG. 5 is a sectional view taken along line V-V of FIG. 2 as a first sectional view of the ultrasonic sensor 101. FIG. 6 is a sectional view taken along line VI-VI of FIG. 3 as a second sectional view of the ultrasonic sensor 101. FIG. 7 is a plan view of the case 1 included in the ultrasonic sensor 101.

As illustrated in FIG. 5, the ultrasonic sensor 101 includes the case 1 and a piezoelectric element 5. The case 1 includes a bottom plate 2 and a side wall 3. The side wall 3 has a cylindrical or substantially cylindrical shape, and the bottom plate 2 is disposed in one end portion of the side wall 3. Another end portion of the side wall 3 is an opening portion 4. That is, the case 1 has a cylindrical or substantially cylindrical shape including a bottom, and the other end portion of the side wall 3 is an end portion of the side wall 3 on a side far from the bottom plate 2. The piezoelectric element 5 is disposed on the bottom plate 2 inside the case 1. As illustrated in FIG. 6, the side wall 3 includes a pair of thick wall portions 31 facing each other and a pair of thin wall portions 32 facing each other. As illustrated in FIGS. 4 and 5, the inner peripheral edge of the other end portion of the side wall 3 includes a chamfered portion 13. The chamfered portion 13 of one of the pair of thin wall portions 32 includes a recessed portion 14.

As illustrated in FIGS. 1 to 5, the case 1 includes a flange portion 9. The flange portion 9 projects outward from the end portion of the side wall 3 on a side farther from the bottom plate 2, that is, from the end portion on the opening portion 4 side. The case 1 is made of metal such as, for example, aluminum or the like. In addition, the case 1 is, for example, integrally provided. As illustrated in FIGS. 4 and 5, the case 1 includes a first surface 15 and an inner peripheral surface 16. The first surface 15 is a surface on a side far from the bottom plate 2, that is, a surface on the opening portion 4 side. The first surface 15 extends in parallel or substantially in parallel to the bottom plate 2. As illustrated in FIG. 5, an inner space of the case 1 is filled with a vibration damper 8. The vibration damper 8 is an insulating material.

As illustrated in FIGS. 1 to 3, the ultrasonic sensor 101 includes two pin terminals 6. In each of the pin terminals 6, one end portion is disposed inside the case 1, and another end portion is disposed outside the case 1. The two pin terminals 6 are electrically connected to the piezoelectric element 5 by a lead wire, a flexible substrate, or the like, for example. In FIGS. 5 and 6, members that electrically connect the pin terminals 6 to the piezoelectric element 5 are omitted.

Figure 8:
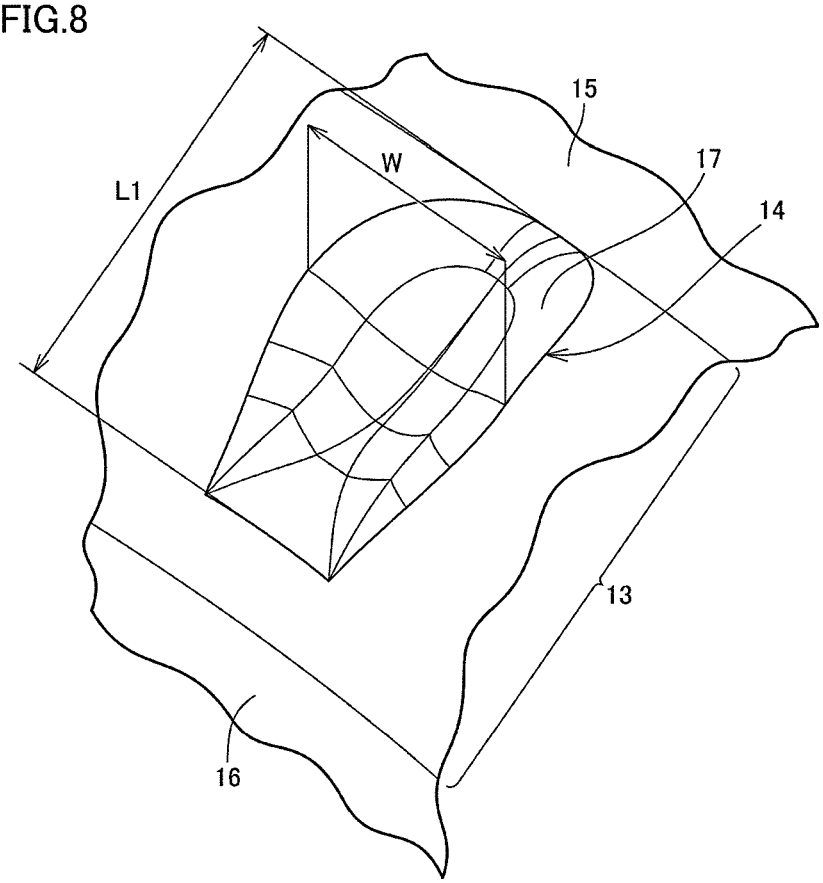
FIG. 8 is a partially enlarged view of the ultrasonic sensor according to the first preferred embodiment of the present invention.

FIG. 8 is an enlarged view of the recessed portion 14 and the vicinity thereof. The recessed portion 14 has a size such that the existence of the recessed portion can be visually recognized. The recessed portion 14 includes a round portion 17. The round portion 17 is provided in an end portion on the first surface 15 side of the recessed portion 14. The round portion 17 has a U-shape in plan view and a curvature radius of such, about mm. An end portion on the inner peripheral surface 16 side of the recessed portion 14 does not include a round portion. A length L1 of the recessed portion 14 in a longitudinal direction is, for example, about 1.0 mm. A length W of the recessed portion 14 in a width direction is, for example, about 0.6 mm. The recessed portion 14 is disposed inside the chamfered portion 13. The recessed portion 14 does not extend to the inner peripheral surface 16.

In the present preferred embodiment, since the case 1 includes the chamfered portion 13, and the chamfered portion 13 of one of the pair of thin wall portions 32 includes the recessed portion 14, the intensity of vibration at a spurious frequency does not increase, and it is possible to identify the direction of the case 1 by the recessed portion 14. That is, the recessed portion 14 can be used as marking to identify the direction of the case 1. In addition, since the recessed portion 14 can also be used as marking to identify the direction of the ultrasonic sensor 101, it is possible to identify the direction of the ultrasonic sensor 101.

Simulation

Figure 9:
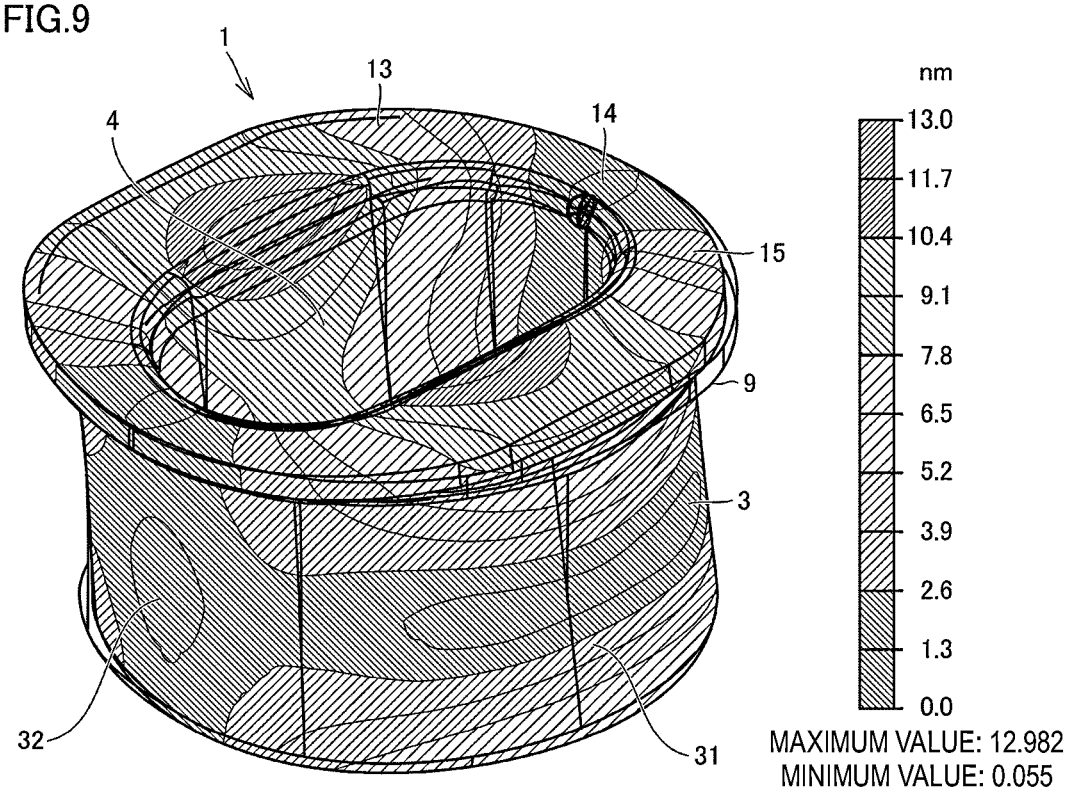
FIG. 9 is a view illustrating a simulation result.

FIG. 9 illustrates a result of simulation regarding the behavior of the case 1 that is caused to vibrate. In FIG. 9, the change amount in each portion of the case 1 is distinguished by hatching. The change amount is particularly large in the center of the inner edge portion of the end portion on the opening portion 4 side of each thick wall portion 31 of the side wall 3. On the other hand, the change amount is particularly small in the center of the inner edge portion of the end portion on the opening portion 4 side of each thin wall portion 32 of the side wall 3, including the chamfered portion 13 of the thin wall portion 32 provided with the recessed portion 14. From FIG. 9, it can be understood, by the presence or absence of the recessed portion 14, that the presence or absence of the recessed portion 14 has little influence on the behavior of the case 1 during vibration.

Relationship Between Position of Recessed Portion 14 and Central Line

Figure 10:
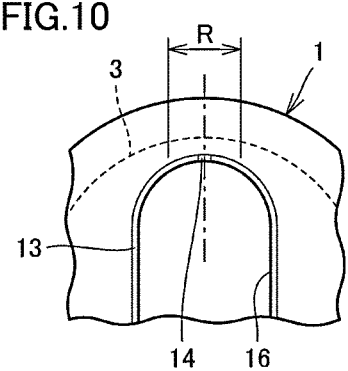
FIG. 10 is an explanatory view of a range in which a recessed portion is provided in the ultrasonic sensor according to the first preferred embodiment of the present invention.

The recessed portion 14 is preferably provided in the central portion of one of the pair of thin wall portions 32. A range in which the recessed portion 14 is provided will be described with reference to FIG. 10. FIG. 10 illustrates a range R in which the recessed portion 14 is preferably provided. The recessed portion 14 is preferably provided in the range R sandwiching the central line, of the chamfered portion 13 in the end portion on the opening portion 4 side of the thin wall portion 32. The range R is, for example, a range of about ±1.5 mm from the central line. That is, the recessed portion 14 is preferably provided within a range of, for example, about 3 mm in width of the central portion.

Comparative Experiment

Figure 11:
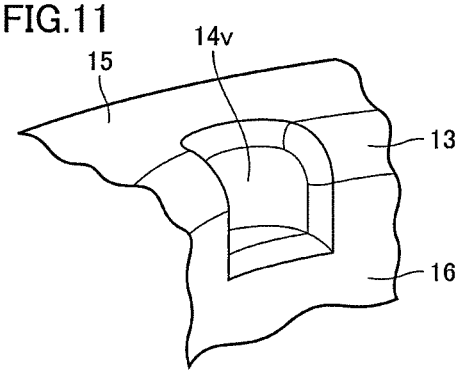
FIG. 11 is a partial perspective view of a first model used in simulation.
Figure 12:
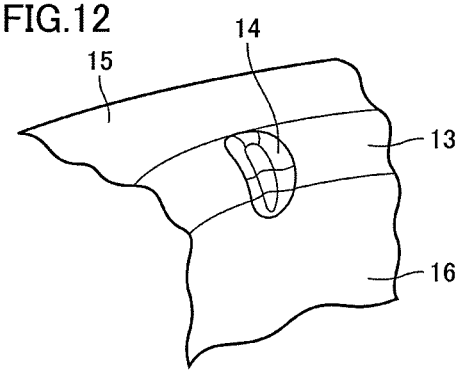
FIG. 12 is a partial perspective view of a second model used in simulation.
Figure 13:
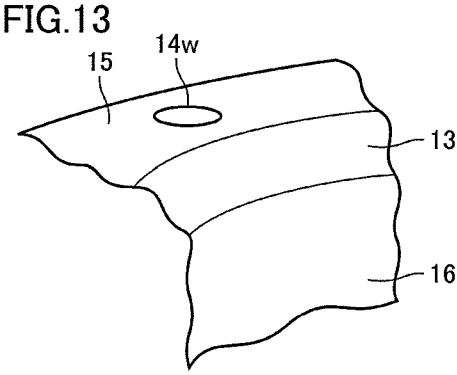
FIG. 13 is a partial perspective view of a third model used in simulation.

Three types of models illustrated in FIGS. 11 to 13 are prepared to perform simulation. The intensity of vibration at a spurious frequency is calculated by piezoelectric resonance analysis. In a model A, a recessed portion is provided in the center or approximate center of the inner edge portion of the end portion on the opening portion 4 side of the thick wall portion 31. In a model B, as illustrated in FIG. 11, a recessed portion 14v is provided in the center or approximate center of the inner edge portion of the end portion on the opening portion 4 side of the thin wall portion 32. The recessed portion 14v is provided from the first surface 15 to the inner peripheral surface 16. In a model C, as illustrated in FIG. 12, the recessed portion 14 is provided in the center or approximate center of the inner edge portion of the end portion on the opening portion 4 side of the thin wall portion 32. The recessed portion 14 of the model C has the same or substantially the same shape as the recessed portion 14 described in the present preferred embodiment. In a model D, as illustrated in FIG. 13, a recessed portion 14w is provided on the first surface 15.

Figure 14:
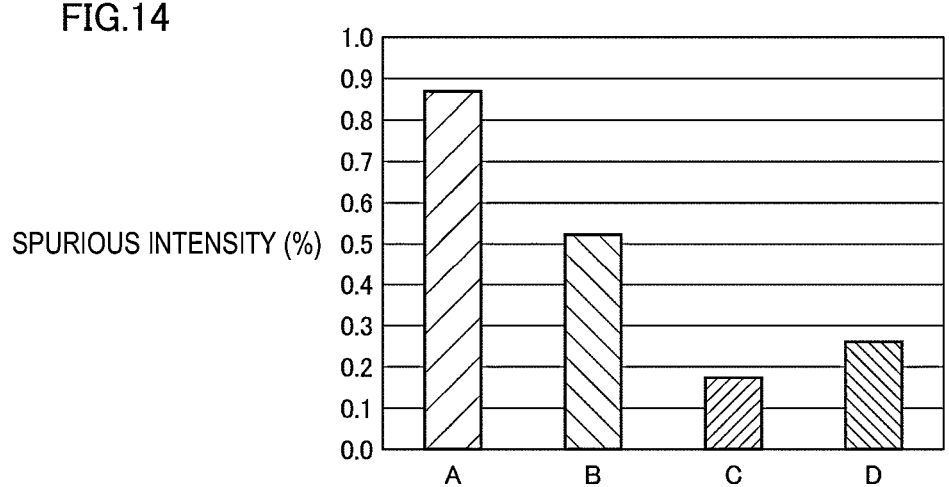
FIG. 14 is a graph of intensity of vibration at a spurious frequency obtained by simulation.

FIG. 14 illustrates the calculation results in the models A to D. A "spurious intensity" of the vertical axis of the graph means the intensity of vibration at a spurious frequency. In the models C and D, the intensity of vibration at a spurious frequency is reduced or prevented to be small. In particular, in the model C, the advantageous effect of restricting the intensity of vibration at a spurious frequency is excellent.

Second Preferred Embodiment

Figure 15:
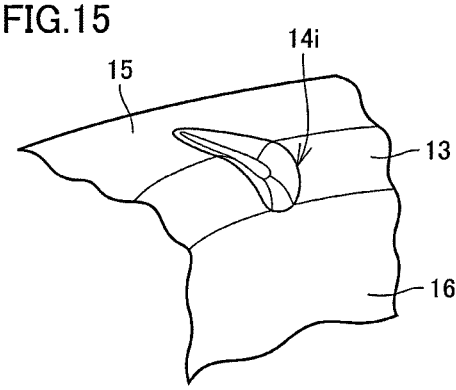
FIG. 15 is a partially enlarged view of an ultrasonic sensor according to a second preferred embodiment of the present invention.

With reference to FIG. 15, an ultrasonic sensor according to a second preferred embodiment of the present invention will be described. FIG. 15 is an enlarged view of a portion of a case of the ultrasonic sensor according to the present preferred embodiment. In the ultrasonic sensor according to the present preferred embodiment, a recessed portion 14i is provided in the chamfered portion 13 of the case. Other configurations are the same or substantially the same as the configurations described in the first preferred embodiment, and thus the description is not repeated.

In the ultrasonic sensor according to the present preferred embodiment, the recessed portion 14i extends from the chamfered portion 13 to the inside of the first surface 15.

In the present preferred embodiment, the same or substantially the same advantageous effects as those of the first preferred embodiment can be obtained.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ultrasonic sensor comprising:
   a case including a cylindrical side wall and a bottom plate in one end portion of the side wall; and
   a piezoelectric element on the bottom plate inside the case; wherein
   the side wall includes a pair of thick wall portions facing each other and a pair of thin wall portions thinner than the thick wall portions facing each other;
   an inner peripheral edge of another end portion of the side wall includes a chamfered portion; and
   the chamfered portion of one of the pair of thin wall portions includes a recessed portion.

2. The ultrasonic sensor according to claim 1, wherein the recessed portion is provided in a central portion of the one of the pair of thin wall portions.

3. The ultrasonic sensor according to claim 1, wherein
   the case includes a first surface defined by a surface of the side wall on a side spaced from the bottom plate and extending in parallel to the bottom plate; and
   the recessed portion extends from the chamfered portion to an inside of the first surface.

4. The ultrasonic sensor according to claim 1, wherein the case includes a flange portion projecting outward from the end portion of the side wall.

5. The ultrasonic sensor according to claim 1, wherein the case is made of metal.

6. The ultrasonic sensor according to claim 1, wherein the case is made of aluminum.

7. The ultrasonic sensor according to claim 1, wherein an inner space of the case is filled with a vibration damper.

8. The ultrasonic sensor according to claim 7, wherein the vibration damper includes an insulating material.

9. The ultrasonic sensor according to claim 1, further comprising:
   two pin terminals electrically connected to the piezoelectric element; wherein
   each of the pin terminals includes one end portion inside the case and another end portion outside the case.

10. The ultrasonic sensor according to claim 1, wherein the recessed portion includes a round portion.

11. The ultrasonic sensor according to claim 10, wherein the round portion has a U shape or an approximate U shape.

12. The ultrasonic sensor according to claim 10, wherein the round portion has a curvature radium of about 0.2 mm.

13. The ultrasonic sensor according to claim 1, wherein a length of the recessed portion is a width direction is about 0.6 mm.

* * * * *